UNITED STATES PATENT OFFICE.

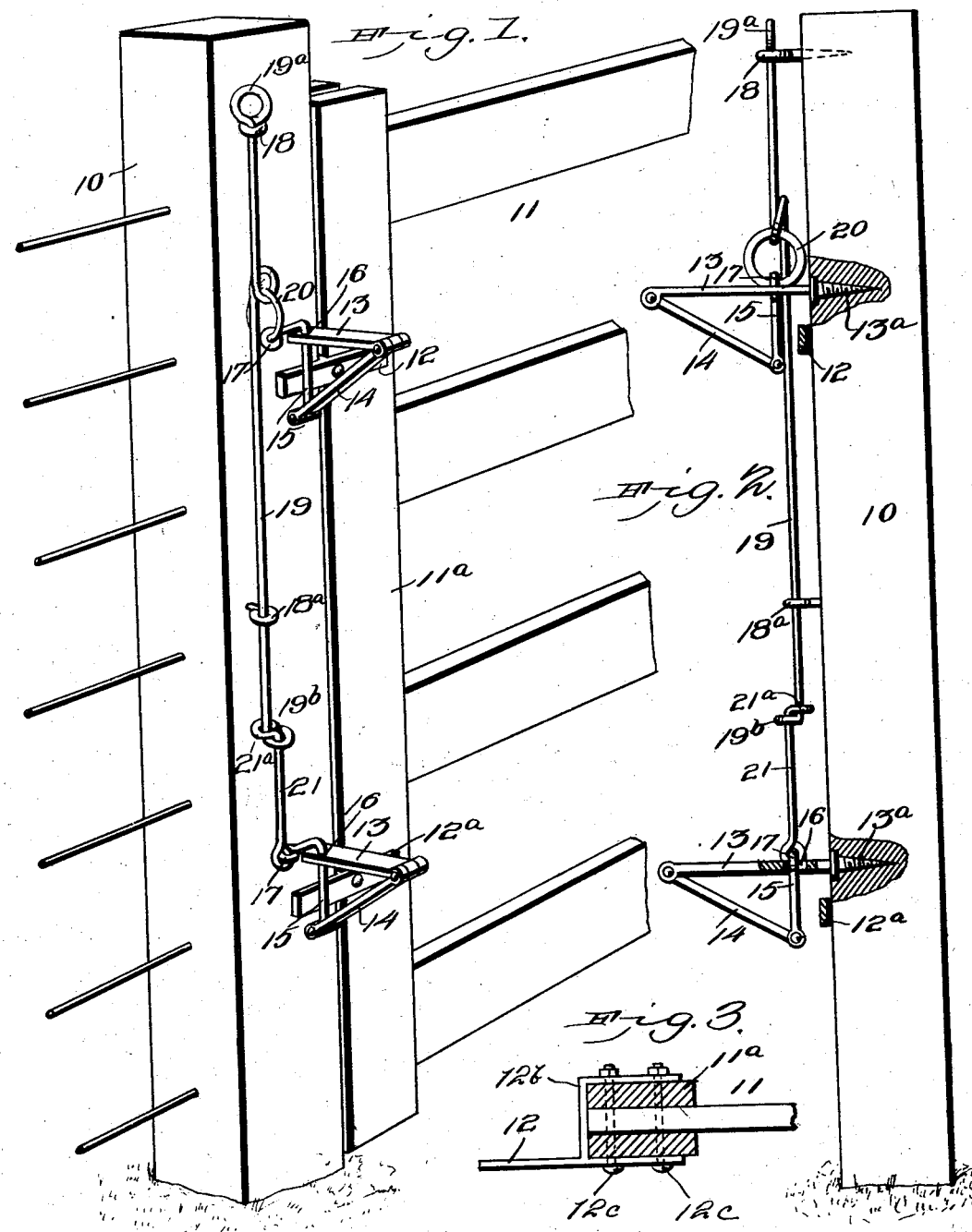

JACOB BURDETT SAMS, OF PHILADELPHIA, MISSOURI.

GATE-LATCH.

SPECIFICATION forming part of Letters Patent No. 724,952, dated April 7, 1903.

Application filed May 14, 1902. Serial No. 107,344. (No model.)

*To all whom it may concern:*

Be it known that I, JACOB BURDETT SAMS, a citizen of the United States, residing at Philadelphia, in the county of Marion and State of Missouri, have invented a new and useful Gate-Latch, of which the following is a specification.

This invention relates to latches employed for securing farm-gates more particularly, but which may be applied to any gate used to secure animals of any kind. It is designed to prevent animals from opening the gate by manipulating the latch inadvertently or otherwise; and it consists in two independent latches connected to be operated in concert, but which when operated singly will not release the gate.

In the drawings illustrative of the invention, Figure 1 represents a perspective view of a gate-post and a portion of a gate with the improvement attached thereto. Fig. 2 is a side view of the gate-post with the latches attached. Fig. 3 is a sectional detail illustrating the construction of the combined stop and clamp.

The gate-post is represented at 10 and a portion of the gate at 11 of the ordinary construction.

The device may be applied to any form of swinging gate, and in the drawings a conventional form of gate is shown.

The vertical member $11^a$ of the gate will be provided with stops 12 $12^a$, spaced apart, the stop $12^a$ preferably near the bottom and the stop 12 preferably near the top, as shown. These stops perform two functions—first, as stops to limit the movement of the gate, and, second, as catches to be engaged by the latches to prevent the gate from being opened, as hereinafter shown. The latches are precisely alike, and like characters of reference will be employed on both, and one of the latches will be employed adjacent to each of the catches 12 and $12^a$. The catches consist each of a bar 13, having a screw $13^a$ formed integral therewith and adapted to be inserted into the post 10 above the catches 12 and $12^a$, as shown. Hinged to the outer end of the bar 13 is a swinging bar 14, and engaging the inner end of this bar 14 is a rod 15, rising upward through an aperture 16 in the bar 13 near the post 10 and turned off laterally and provided with an eye 17. It will be understood by this construction that when the rods 15 are drawn upward the bars 14 will be drawn upward with them to a position above the catches 12 $12^a$, and thus release the gate. On the other hand, when the rods 15 are depressed they will form stops to engage the catches 12 and keep the gate closed.

When the gate is to be closed, the catches 12 $12^a$ will strike the inclined bars 14 and elevate them, together with the rods 15, and pass beyond them, when the bars and rods will fall by gravity in front of the latches, and thus lock the gate closed.

Supported loosely by eyes 18 $18^a$ is a rod 19, having a handle $19^a$, by which it may be moved vertically. The rod 19 is coupled to the upper rod 15 by a loose link 20, engaging the eye 16 of the upper rod. The play of the link 20 will be sufficient to permit the bar 14 of the upper latch to be elevated above the catch 12 without moving the rod 19 upward; but any upward movement of the rod 19 by means of its handle $19^a$ will cause the link 20 to be drawn upward, and thus operate the upper latch. The lower end of the rod 19 is connected by a link 21 with the eye 17 of the lower rod 15 of the lower latch. This link 21 has a laterally-turned eye $21^a$ engaging the rod 19 above a laterally-turned eye $19^b$ on the lower end of the rod, so that the link 21 is free to rise upon the rod, but will be carried upward by the rod at any upward movement of the latter. By this construction it will be understood any upward movement of the lower latch-bar 14 will not cause any upward movement of the rod 19; but, on the other hand, any upward movement of the rod 19, as by its handle $19^a$, will carry the lower latch-bar 14 upward with it through its connection to the latch-bar by the link 21. By this simple arrangement either of the latches may be actuated by pressing upward upon the latch-bars 14; but the gate will not be released unless the bar 19 be elevated, so as to actuate both latches together.

Horses and cattle frequently learn to manipulate ordinary gate-latches and open gates; but with the form of latch herein illustrated it will be impossible for an animal to operate both latches at once, unless they manipulate the rod 19, which will be so placed and constructed that no animal can actuate it.

Hogs and sheep sometimes learn to manipulate gate-latches when they are located low enough for them to reach them; but with this construction of latch such animals could not open the gate, as the manipulation of the lower latch, as before stated, would not release the gate.

The latches may be made of any required size and the parts may be modified and altered in minor particulars without affecting the principle of the invention or sacrificing any of its advantages.

The bars 12 12$^a$ are each formed with a branch 12$^b$, (see Fig. 3,) embracing the gate and secured thereto by transverse bolts 12$^c$, whereby the stop-bars are utilized as clamps to assist in supporting the gate.

Having thus described my invention, what I claim is—

1. In a gate-latch, a plurality of bars attached to the gate-post, downwardly and inwardly extending members flexibly connected with the outer ends of said bars, supporting means flexibly connected with the free ends of the downwardly and inwardly extending hinged members extending upwardly through the bars and supported thereon, means for connecting and simultaneously actuating said supporting means to operate the hinged latch members, and latch-engaging means.

2. A gate-latch comprising a plurality of approximately horizontal bars permanently disposed in vertical alinement, downwardly and inwardly extending latch members hingedly connected with the outer ends of stationary members, supporting members flexibly connected with the inner ends of said latch members, extending upwardly through the supporting-bars and having bent portions resting thereon, a vertically-movable operating-rod flexibly connected with the bent ends of said supporting members, whereby they may be operated in unison, and latch-engaging means.

In testimony that I claim the foregoing as my own I have hereto affixed my signature in the presence of two witnesses.

JACOB BURDETT SAMS.

Witnesses:
H. CLAY HEATHER,
W. B. MARKELL.